United States Patent
Neff et al.

(10) Patent No.: US 10,205,355 B2
(45) Date of Patent: Feb. 12, 2019

(54) HIGH-TORQUE, LOW-CURRENT BRUSHLESS MOTOR

(71) Applicant: Systems, Machines, Automation Components Corporation, Carlsbad, CA (US)

(72) Inventors: Edward A. Neff, Cardiff-by-the-Sea, CA (US); Toan M. Vu, San Diego, CA (US); Reyhan Zanis, Carlsbad, CA (US)

(73) Assignee: Systems, Machines, Automation Components Corporation

( * ) Notice: Subject to any disclaimer, the term of this patent is extended or adjusted under 35 U.S.C. 154(b) by 0 days.

(21) Appl. No.: 15/844,423

(22) Filed: Dec. 15, 2017

(65) Prior Publication Data
US 2018/0191210 A1    Jul. 5, 2018

Related U.S. Application Data

(63) Continuation of application No. 15/728,454, filed on Oct. 9, 2017.
(Continued)

(51) Int. Cl.
| H02K 21/12 | (2006.01) |
| H02K 1/18 | (2006.01) |
| H02K 1/27 | (2006.01) |
| H02K 5/173 | (2006.01) |
| H02K 7/08 | (2006.01) |
| H02K 15/03 | (2006.01) |
| H02K 21/14 | (2006.01) |
| H02K 21/22 | (2006.01) |

(Continued)

(52) U.S. Cl.
CPC ............ *H02K 1/185* (2013.01); *H02K 1/278* (2013.01); *H02K 1/2726* (2013.01); *H02K 1/2766* (2013.01); *H02K 1/2786* (2013.01); *H02K 5/1737* (2013.01); *H02K 7/083* (2013.01); *H02K 11/225* (2016.01); *H02K 15/03* (2013.01); *H02K 21/14* (2013.01); *H02K 21/22* (2013.01); *H02P 1/00* (2013.01)

(58) Field of Classification Search
CPC ......... H02K 15/03; H02K 21/14; H02K 21/22
USPC ......... 310/112, 113, 114, 71, 156.01–156.84
See application file for complete search history.

(56) References Cited

U.S. PATENT DOCUMENTS

| 3,602,749 A | 8/1971 | Esters |
| 4,488,242 A | 12/1984 | Tabata et al. |

(Continued)

OTHER PUBLICATIONS

International Search Report and Written Opinion for International Application No. PCT/US2018/012223, dated Apr. 24, 2018, 9 pages.

*Primary Examiner* — Hanh Nguyen
(74) *Attorney, Agent, or Firm* — Cooley LLP

(57) ABSTRACT

An electric motor including a coil assembly having a plurality of coils which may be arranged in the shape of a cylinder. The motor further includes a rotor including a plurality of outer magnets configured as a first Halbach cylinder surrounding the coil assembly. An outer magnet housing of the rotor is coupled to and surrounds the plurality of outer magnets. A plurality of inner magnets are arranged as a second Halbach cylinder with the coil assembly being interposed between the plurality of inner magnets and the plurality of outer magnets. An inner magnet housing is coupled to the plurality of inner magnets and surrounds an output shaft.

12 Claims, 9 Drawing Sheets

US 10,205,355 B2

Page 2

Related U.S. Application Data

(60) Provisional application No. 62/441,913, filed on Jan. 3, 2017.

(51) Int. Cl.
*H02P 1/00* (2006.01)
*H02K 11/225* (2016.01)

(56) References Cited

U.S. PATENT DOCUMENTS

| | | |
|---|---|---|
| 4,576,421 A | 3/1986 | Teramachi |
| 4,616,886 A | 10/1986 | Teramachi |
| 4,693,676 A | 9/1987 | Inaba |
| 4,696,144 A | 9/1987 | Bankuty et al. |
| 4,745,589 A | 5/1988 | Nomura |
| 4,799,803 A | 1/1989 | Tanaka |
| 4,804,913 A | 2/1989 | Shimizu et al. |
| 4,808,955 A | 2/1989 | Godkin et al. |
| 4,857,786 A | 8/1989 | Nihei et al. |
| 4,858,452 A | 8/1989 | Ibrahim |
| 5,051,635 A | 9/1991 | Kasahara |
| 5,053,670 A | 10/1991 | Kosugi |
| 5,057,753 A | 10/1991 | Leuthold et al. |
| 5,111,088 A | 5/1992 | Fujino |
| 5,160,865 A | 11/1992 | Gururangan |
| 5,161,586 A | 11/1992 | Auriemma |
| 5,175,456 A | 12/1992 | Neff et al. |
| 5,201,838 A | 4/1993 | Roudaut |
| 5,225,725 A | 7/1993 | Shiraki et al. |
| 5,270,625 A | 12/1993 | Neff |
| 5,317,222 A | 5/1994 | Neff et al. |
| 5,376,862 A | 12/1994 | Stevens |
| 5,446,323 A | 8/1995 | Neff et al. |
| 5,450,050 A | 9/1995 | Ban et al. |
| 5,476,324 A | 12/1995 | Takei |
| 5,501,498 A | 3/1996 | Ulrich |
| 5,594,309 A | 1/1997 | McConnell et al. |
| 5,685,214 A | 11/1997 | Neff et al. |
| 5,722,300 A | 3/1998 | Burkhard et al. |
| 5,751,075 A | 5/1998 | Kwon et al. |
| 5,751,077 A | 5/1998 | Gonzalez |
| 5,834,872 A | 11/1998 | Lamb |
| 5,859,482 A | 1/1999 | Crowell et al. |
| 5,893,646 A | 4/1999 | Mizutani et al. |
| 5,952,589 A | 9/1999 | Leung et al. |
| 6,043,573 A | 3/2000 | Neff et al. |
| 6,091,167 A | 7/2000 | Vu et al. |
| 6,118,360 A | 9/2000 | Neff |
| 6,223,971 B1 | 5/2001 | Sato |
| 6,290,308 B1 | 9/2001 | Zitzelsberger |
| 6,404,086 B1 | 6/2002 | Fukasaku et al. |
| 6,439,103 B1 | 8/2002 | Miller |
| 6,495,935 B1 | 12/2002 | Mishler |
| 6,525,439 B2 * | 2/2003 | Whelan .................. H02K 11/33 310/239 |
| 6,741,151 B1 | 5/2004 | Livshitz et al. |
| 6,848,164 B2 | 2/2005 | Jung |
| 6,907,651 B1 | 6/2005 | Fisher et al. |
| 6,997,077 B2 | 2/2006 | Kollmann et al. |
| 7,011,117 B1 | 3/2006 | Carpino et al. |
| 7,053,583 B1 | 5/2006 | Hazelton |
| 7,168,748 B2 | 1/2007 | Townsend et al. |
| 7,323,798 B2 | 1/2008 | Hartramph et al. |
| 7,336,007 B2 | 2/2008 | Chitayat |
| 7,482,717 B2 | 1/2009 | Hochhalter et al. |
| 7,517,721 B2 | 4/2009 | Ito et al. |
| 7,800,470 B2 | 9/2010 | Wright et al. |
| 7,960,893 B2 | 6/2011 | Kim et al. |
| 8,083,278 B2 | 12/2011 | Yuan |
| 8,415,838 B1 | 4/2013 | Eghbal et al. |
| 8,487,484 B1 * | 7/2013 | Miller, Jr. ............... H02K 7/06 310/12.14 |
| 8,498,741 B2 | 7/2013 | Ihrke et al. |
| 8,578,760 B2 | 11/2013 | Calhoun et al. |
| 8,890,389 B2 | 11/2014 | Li et al. |
| 9,375,848 B2 | 6/2016 | Neff et al. |
| 9,381,649 B2 | 7/2016 | Neff et al. |
| 9,731,418 B2 | 8/2017 | Neff et al. |
| 9,748,823 B2 | 8/2017 | Neff et al. |
| 9,748,824 B2 | 8/2017 | Neff et al. |
| 9,780,634 B2 | 10/2017 | Neff et al. |
| 9,871,435 B2 | 1/2018 | Neff et al. |
| 2001/0013728 A1 * | 8/2001 | Harita ..................... H02K 5/145 310/71 |
| 2003/0009241 A1 | 1/2003 | Kruger et al. |
| 2003/0218391 A1 | 11/2003 | Hirata |
| 2004/0076348 A1 | 4/2004 | Dalessandro et al. |
| 2004/0227535 A1 | 11/2004 | Kobayashi et al. |
| 2004/0232800 A1 | 11/2004 | Seguchi et al. |
| 2005/0211512 A1 | 9/2005 | Fenwick |
| 2005/0234565 A1 | 10/2005 | Marks et al. |
| 2005/0253469 A1 | 11/2005 | Hochhalter et al. |
| 2005/0258701 A1 | 11/2005 | Soitu |
| 2006/0023980 A1 | 2/2006 | Kato et al. |
| 2006/0113847 A1 | 6/2006 | Randall et al. |
| 2006/0279140 A1 | 12/2006 | Jenny |
| 2007/0053781 A1 | 3/2007 | Davis |
| 2007/0296364 A1 | 12/2007 | Shoemaker et al. |
| 2008/0048505 A1 | 2/2008 | Moriyama et al. |
| 2008/0150559 A1 | 6/2008 | Nayak et al. |
| 2008/0157607 A1 | 7/2008 | Scheich et al. |
| 2008/0258654 A1 | 10/2008 | Neff |
| 2009/0040247 A1 | 2/2009 | Cato et al. |
| 2009/0058198 A1 | 3/2009 | Finkbeiner et al. |
| 2009/0058201 A1 | 3/2009 | Brennvall |
| 2009/0058581 A1 | 3/2009 | Neff et al. |
| 2009/0114052 A1 | 5/2009 | Haniya et al. |
| 2009/0152960 A1 | 6/2009 | Kimura et al. |
| 2009/0218894 A1 | 9/2009 | Aso et al. |
| 2009/0261663 A1 | 10/2009 | Aso et al. |
| 2009/0278412 A1 | 11/2009 | Kimura et al. |
| 2009/0309442 A1 | 12/2009 | Qu et al. |
| 2010/0005918 A1 | 1/2010 | Mizuno et al. |
| 2010/0133924 A1 | 6/2010 | Neff et al. |
| 2010/0171378 A1 | 7/2010 | Kim et al. |
| 2010/0181858 A1 * | 7/2010 | Hibbs ..................... H02K 1/27 310/156.07 |
| 2010/0203249 A1 | 8/2010 | Elgimiabi |
| 2010/0244605 A1 | 9/2010 | Nakano et al. |
| 2010/0274365 A1 | 10/2010 | Evans et al. |
| 2010/0295401 A1 | 11/2010 | Nakagawa et al. |
| 2011/0037333 A1 * | 2/2011 | Atallah ................. H02K 49/102 310/98 |
| 2011/0068595 A1 | 3/2011 | Ihrke et al. |
| 2011/0132169 A1 | 6/2011 | Kapoor et al. |
| 2011/0187222 A1 | 8/2011 | Li et al. |
| 2012/0043832 A1 | 2/2012 | Neff et al. |
| 2012/0080960 A1 | 4/2012 | Neff et al. |
| 2012/0206024 A1 | 8/2012 | Yoshida et al. |
| 2012/0299405 A1 | 11/2012 | Li et al. |
| 2012/0305092 A1 | 12/2012 | Corso et al. |
| 2013/0154397 A1 | 6/2013 | Sullivan |
| 2014/0159407 A1 | 6/2014 | Neff et al. |
| 2014/0159408 A1 | 6/2014 | Neff et al. |
| 2014/0159513 A1 | 6/2014 | Neff et al. |
| 2014/0159514 A1 | 6/2014 | Neff et al. |
| 2014/0210396 A1 | 7/2014 | Yamanaka et al. |
| 2014/0317941 A1 | 10/2014 | Patti et al. |
| 2015/0168483 A1 | 6/2015 | Kim |
| 2015/0171723 A1 | 6/2015 | Neff et al. |
| 2015/0236575 A1 * | 8/2015 | Walsh ..................... H02K 21/46 310/156.07 |
| 2015/0303785 A1 | 10/2015 | Neff et al. |
| 2016/0013712 A1 | 1/2016 | Neff et al. |
| 2016/0184989 A1 | 6/2016 | Neff et al. |
| 2016/0229064 A1 | 8/2016 | Neff et al. |
| 2017/0012519 A1 | 1/2017 | Neff et al. |
| 2017/0014964 A1 | 1/2017 | Neff |
| 2017/0089976 A1 | 3/2017 | Neff et al. |
| 2018/0071921 A1 | 3/2018 | Neff et al. |

* cited by examiner

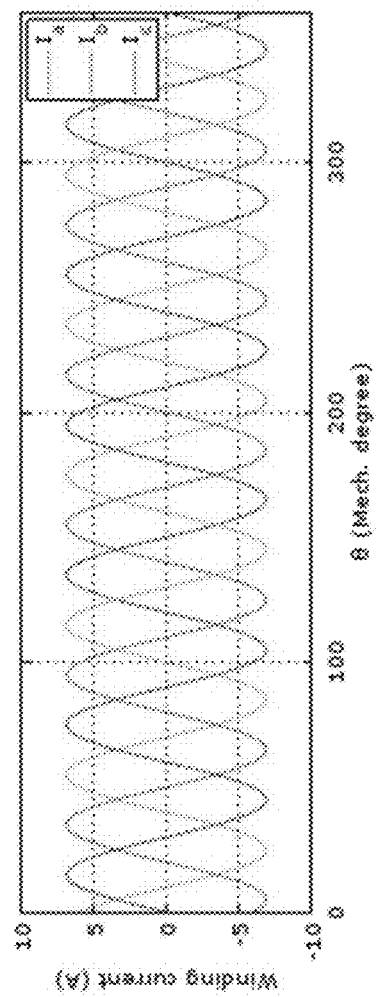
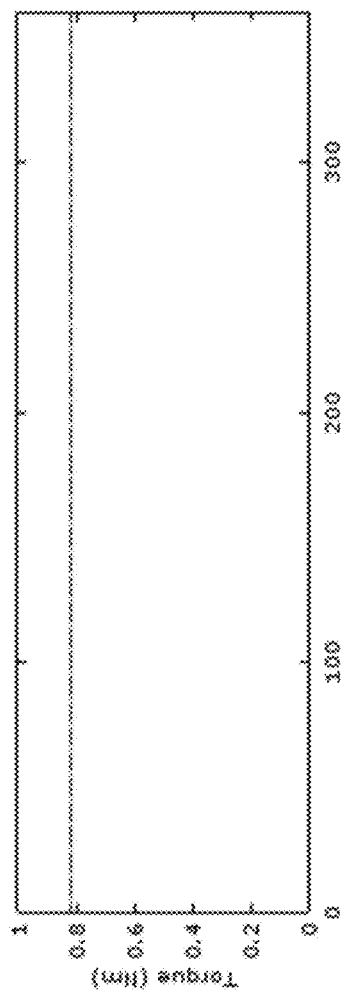
FIG. 6B
FIG. 6A

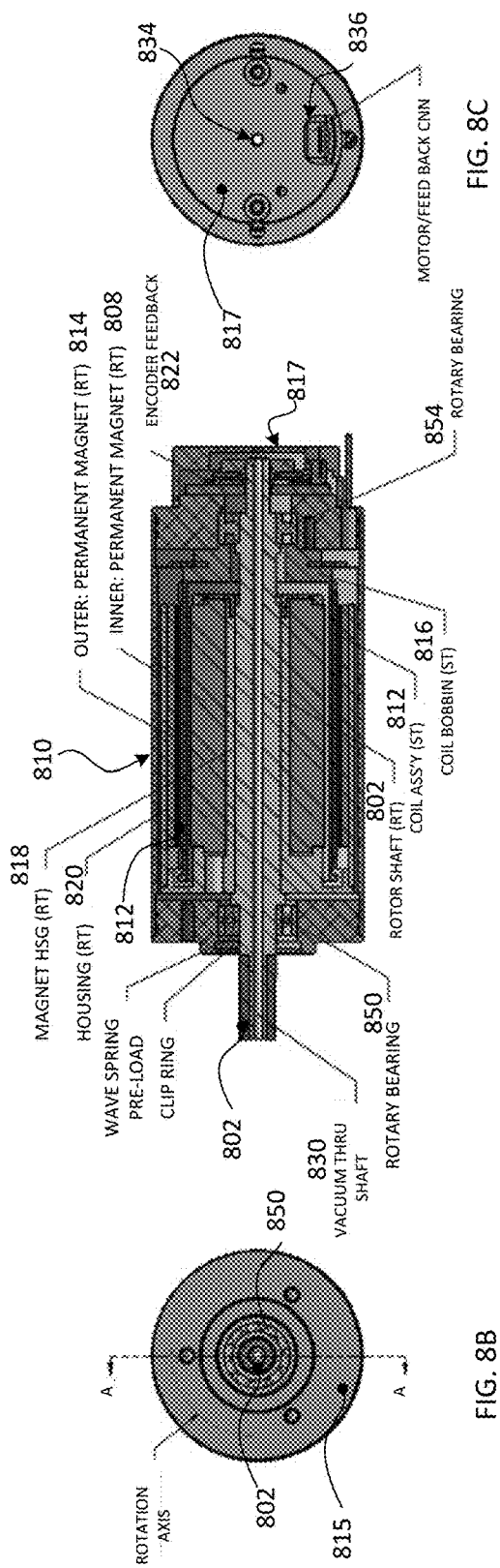
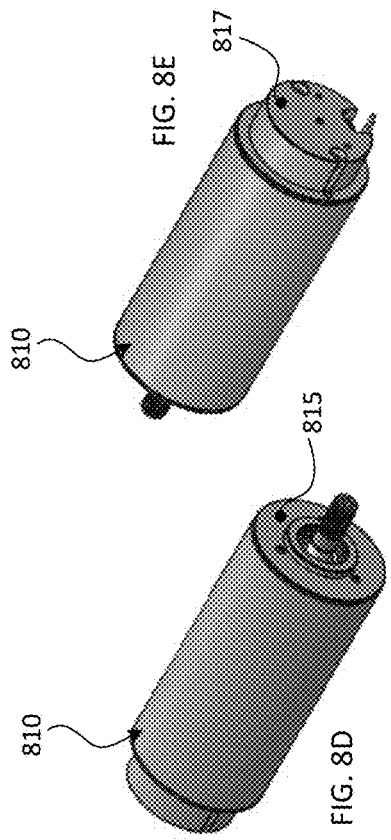

HIGH-TORQUE, LOW-CURRENT BRUSHLESS MOTOR

CROSS REFERENCE TO RELATED APPLICATIONS

The present application is a continuation of U.S. application Ser. No. 15/728,454, entitled HIGH-TORQUE, LOW-CURRENT BRUSHLESS MOTOR, filed Oct. 9, 2017, which claims the benefit of priority under 35 U.S.C. § 119(e) of Provisional Application No. 62/441,913, entitled HIGH-TORQUE, LOW-CURRENT BRUSHLESS MOTOR, filed Jan. 3, 2017, the content of which is hereby incorporated by reference in its entirety for all purposes.

FIELD

This disclosure relates generally to electric motors and, more particularly, to brushless electric motors.

BACKGROUND

Known electric motors derive power from interactions of magnetic fields produced by permanent magnets or electromagnets. Conventional rotary coil motors generally include a rotor ring comprised of magnetic elements configured to pass through a stator made up of a set of coils arranged in a ring. Unfortunately, the torque produced by such rotary coil motors may be insufficient for various applications having low current requirements.

SUMMARY

The disclosure is directed in one respect to an apparatus for use with a brushless motor. The apparatus includes a coil assembly having a plurality of coils wherein the plurality of coils are arranged in the shape of a cylinder. A rotor includes a plurality of outer magnets configured as a first Halbach cylinder surrounding the coil assembly. The rotor further includes an outer magnet housing coupled to the plurality of outer magnets, the outer magnet housing surrounding the plurality of outer magnets. A plurality of inner magnets of the rotor are arranged as a second Halbach cylinder such that the coil assembly is interposed between the plurality of inner magnets and the plurality of outer magnets. The rotor also includes an inner magnet housing coupled to the plurality of inner magnets and an output shaft surrounded by the inner magnet housing.

In one aspect the disclosure pertains to an electric motor which includes a coil assembly having a plurality of coils. The plurality of coils may be arranged in the shape of a cylinder. A rotor includes a plurality of outer magnets configured as a first Halbach cylinder surrounding the coil assembly. The rotor further includes an outer magnet housing coupled to the plurality of outer magnets, the outer magnet housing surrounding the plurality of outer magnets. A plurality of inner magnets of the rotor are arranged as a second Halbach cylinder such that the coil assembly is interposed between the plurality of inner magnets and the plurality of outer magnets. The rotor also includes an inner magnet housing coupled to the plurality of inner magnets and an output shaft surrounded by the inner magnet housing. The electric motor further includes a motor housing surrounding the plurality of outer magnets. An end plate includes an electrical connector having an electrical connection to the coil assembly.

In another aspect the disclosure relates to an apparatus for use with a brushless motor. The apparatus includes a coil assembly having a plurality of coils which may be arranged in the shape of a cylinder. The apparatus further includes a rotor including a plurality of outer magnets configured as a first Halbach cylinder surrounding the coil assembly. A cylindrical support structure may be coupled to, and surround, the plurality of outer magnets. A plurality of inner magnets may be arranged as a second Halbach cylinder. The coil assembly may be interposed between the plurality of inner magnets and the plurality of outer magnets. The apparatus further includes a core element surrounded by the plurality of inner magnets.

The disclosure also pertains to an electric motor including a coil assembly having a plurality of coils which may be arranged in the shape of a cylinder. The motor further includes a rotor including a plurality of outer magnets configured as a first Halbach cylinder surrounding the coil assembly. A cylindrical support structure may be coupled to, and surround, the plurality of outer magnets. A plurality of inner magnets may be arranged as a second Halbach cylinder. The coil assembly may be interposed between the plurality of inner magnets and the plurality of outer magnets. The motor further includes a core element which defines an interior space and is coupled to the plurality of inner magnets. A motor output shaft is coupled to the rotor. A motor housing surrounds the rotor and the coil assembly and may define an aperture circumscribing the motor output shaft.

BRIEF DESCRIPTION OF THE DRAWINGS

The features, nature and advantages of the present disclosure will become more apparent from the detailed description set forth below when taken in conjunction with the drawings in which like reference characters identify correspondingly throughout and wherein:

FIG. 6A illustrates an exemplary set of winding currents produced by the motor control apparatus of FIG. 5.

FIG. 6B illustrates that an embodiment of the high-torque, low-current brushless motor may generate an essentially constant torque in response to the winding currents depicted in FIG. 6A.

FIGS. 8A-8E are various views of an alternate embodiment of a brushless electric motor including a dual magnetic rotor.

DETAILED DESCRIPTION

Figure 1:
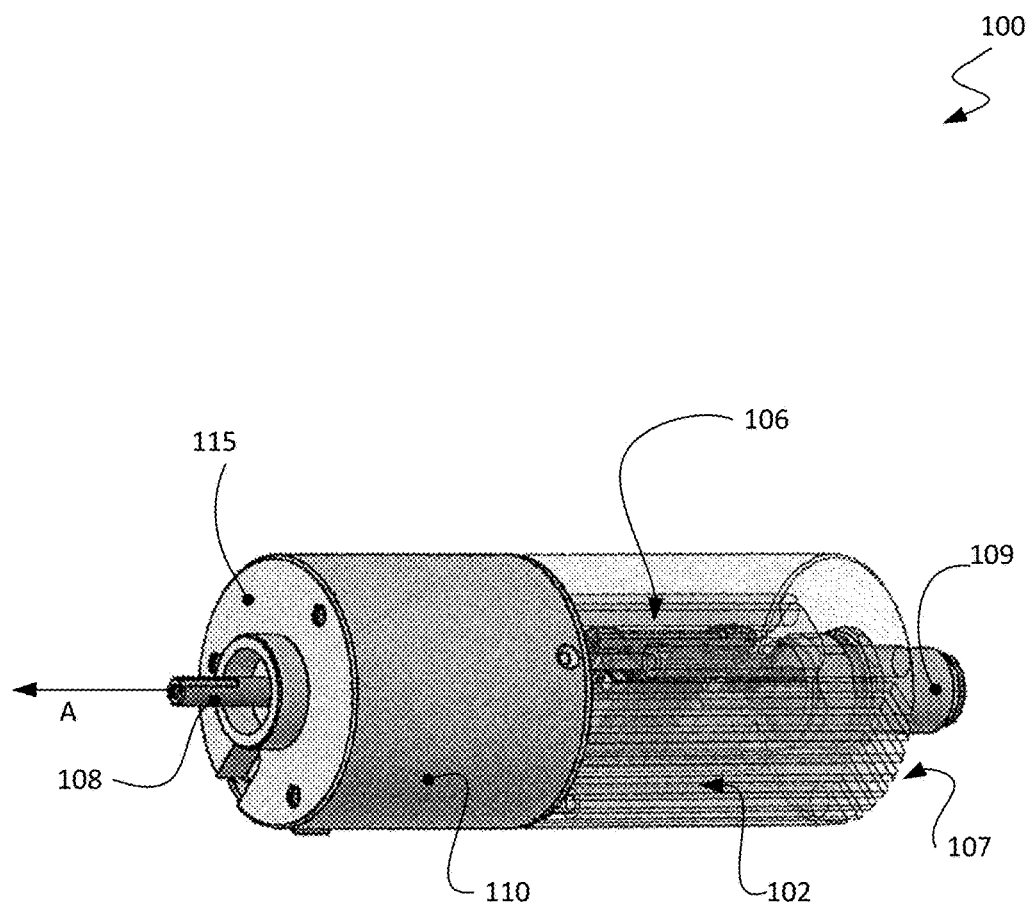
FIG. 1 illustrates a perspective and partially transparent view of a high-torque, low-current brushless motor in accordance with the disclosure.

In the following description of exemplary embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the present invention.

The word "exemplary" is used herein to mean "serving as an example or illustration." Any aspect or design described herein as "exemplary" is not necessarily to be construed as preferred or advantageous over other aspects or designs.

It should be understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure.

Reference will now be made in detail to aspects of the subject technology, examples of which are illustrated in the accompanying drawings, wherein like reference numerals refer to like elements throughout.

The electric motor disclosed herein may be used in connection with applications requiring relatively high-torque. In addition, embodiments of the motor draw relatively low current draw and thereby mitigate overheating.

In one embodiment the electric motor includes a coil assembly having a plurality of coils. The plurality of coils may be arranged in the shape of a cylinder. The electric motor further includes a rotor including a plurality of outer magnets configured as a first Halbach array wherein the plurality of outer magnets surround the coil assembly. A plurality of inner magnets are arranged as a second Halbach array wherein the plurality of inner magnets are surrounded by the coil assembly. A core element is coupled to the plurality of inner magnets and a motor output shaft is positioned within an interior space circumscribed by the core element.

Turning now to the drawings, FIG. 1 illustrates a perspective and partially transparent view of a high-torque, low-current brushless motor 100 in accordance with the disclosure. As shown in FIG. 1, the brushless motor 100 can include a motor output shaft 108 and a motor housing 110 surrounding dual magnetic cylinders (not shown). The motor 100 further includes a controller housing 112, which is depicted partially transparently in FIG. 1. The controller housing 112 surrounds a controller 106 and includes an end plate 107 through which protrudes a servo connector interface 109. During operation of the motor 100, the dual magnetic cylinders and the motor output shaft 108 rotate about a longitudinal axis A. The motor housing 110, controller housing 112, end plate 107 and a top plate 115 do not rotate during operation of the motor.

Although controller 106 is shown as being within a controller housing 112 abutting the motor housing 110, in other embodiments the controller for the electric motor may be in essentially any location. For example, the controller may be located remote from the motor (e.g., in a remote computer in network communication with the motor).

Figures 2A, 2B, 2C:
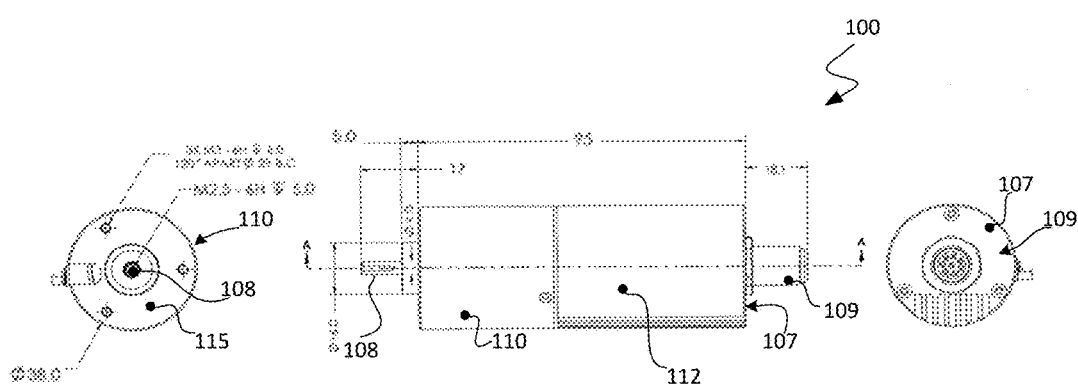
FIGS. 2A, 2B and 2C respectively provide top end, side and rear end views of the motor of FIG. 1.

FIGS. 2A, 2B and 2C respectively provide top end, side and rear end views of the motor 100 of FIG. 1.

Figure 3:
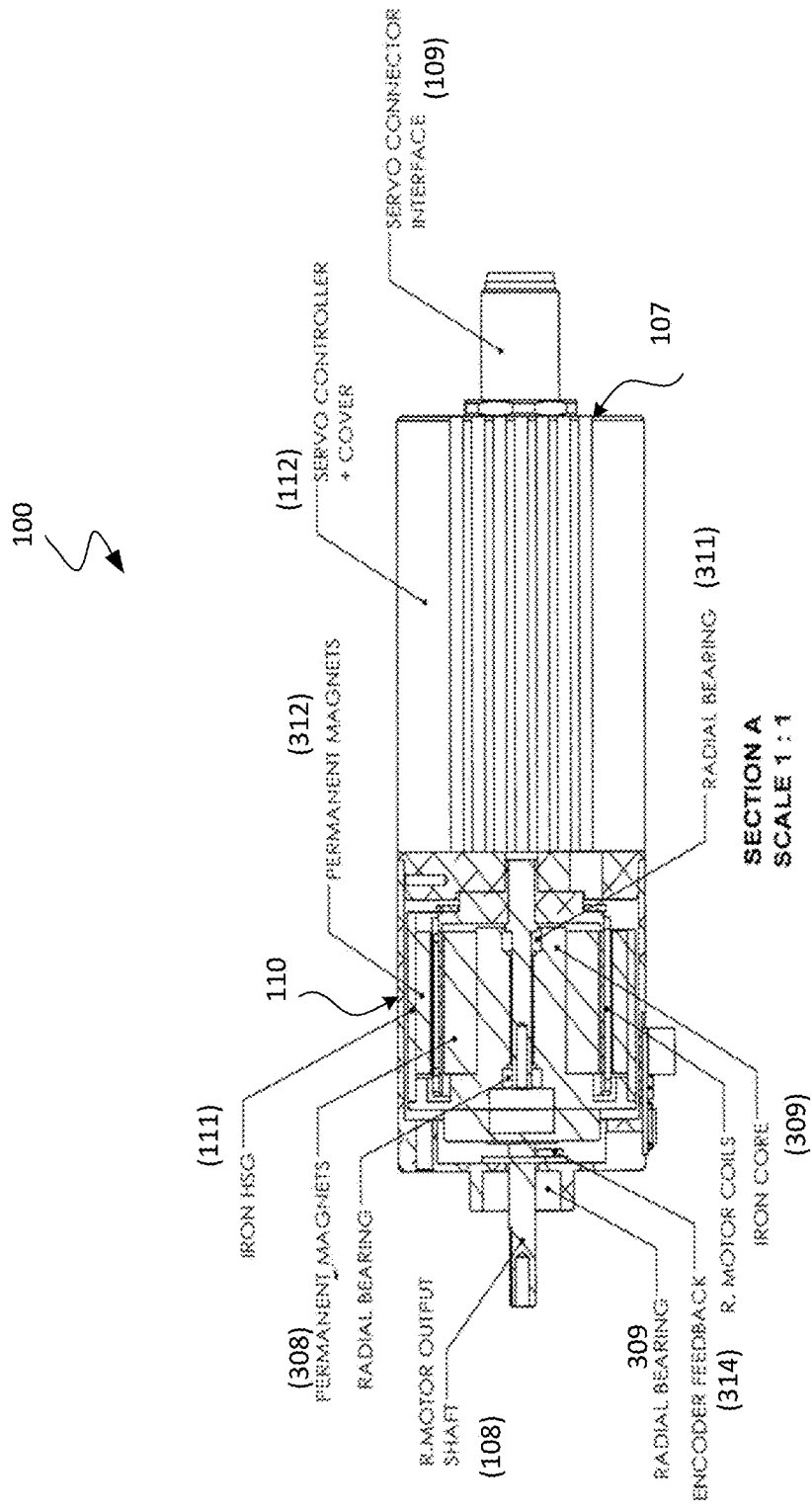
FIG. 3 provides a side sectional view of a top portion of the motor of FIG. 1.

Attention is now directed to FIG. 3, which provides a side sectional view of a top portion of the motor 100 including the motor housing 110. The remainder of the motor 100, including the controller housing 112, is not shown in section in FIG. 3. In one embodiment the motor 100 includes a plurality of rotational components including the motor output shaft 108, a plurality of inner magnets 308 arranged in the shape of a cylinder circumscribing the longitudinal axis A, and a plurality of outer magnets 312 also cylindrically arranged to circumscribe the longitudinal axis A. The plurality of inner magnets 308 are coupled to an iron core member 309. First and second radial bearings 309, 311 circumscribe the output shaft 108. An encoder feedback read head 320 is positioned to read an encoder feedback scale positioned on, for example, the output shaft 108 or on a rotating surface coupled to the output shaft.

The motor 100 further includes a plurality of non-rotational components including a set of 12 coils 314 arranged to form a cylindrical structure interposed between the plurality of inner magnets 308 and the plurality of outer magnets 312. In other implementations a different number of coils 312 may be used (e.g., 6, 9 or 18 coils). The coils 314 may operate like brushless DC coils with a pre-defined pitch. In other embodiments the coils may be comprised of flat wire. In one embodiment each coil is substantially rectangular and is molded with a radius that results in a pre-defined assembly diameter and a pre-defined total resistance. The coils 312 may be attached to the motor housing 110 or to a molded structure in turn coupled to the motor housing 110.

Figure 4:
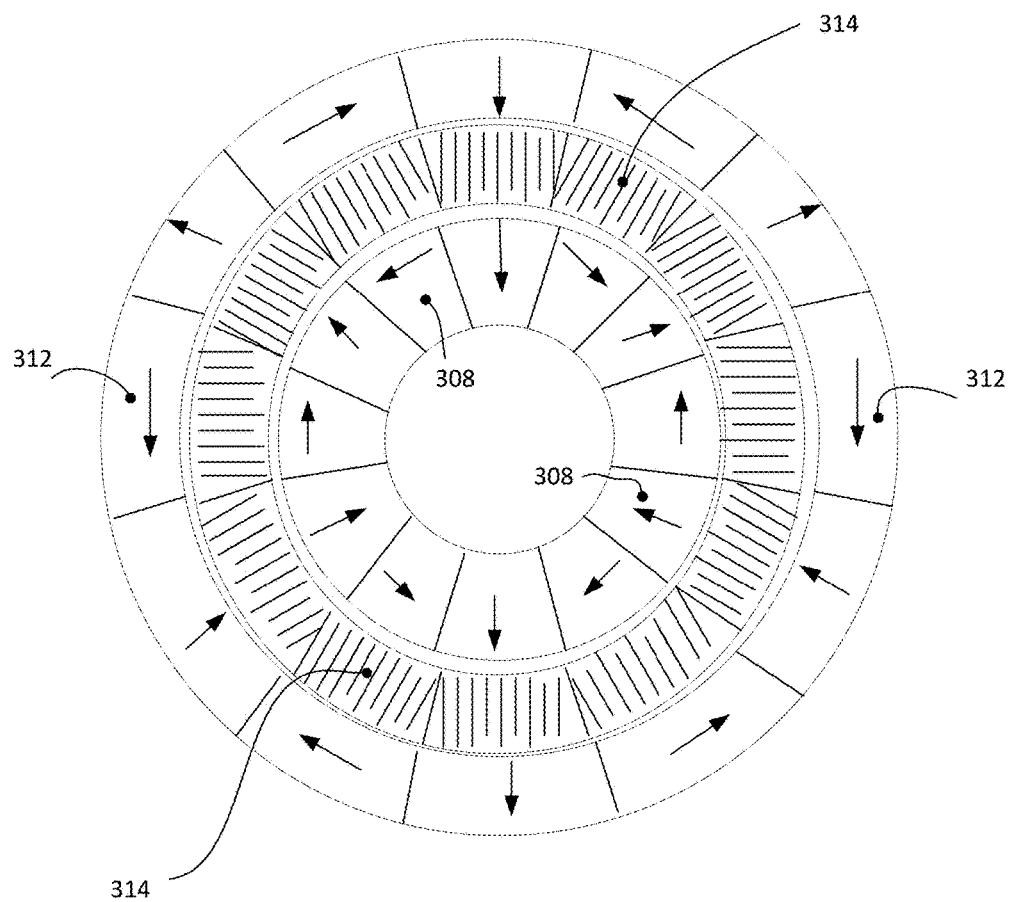
FIG. 4 is a sectional view of the motor of FIG. 1 transverse to a longitudinal axis A

Turning now to FIG. 4, a sectional view of the motor 100 is provided transverse to the longitudinal axis A. As shown, in the embodiment of FIG. 4, the plurality of inner magnets 308 are arranged so as to form an inner Halbach cylinder and the plurality of outer magnets 312 are arranged so as to form an outer Halbach cylinder. The plurality of coils 314 are arranged in the shape of a cylinder and interposed between the plurality of inner magnets 308 and the plurality of outer magnets 312. The plurality of inner magnets 308 and the plurality of outer magnets 312 are included within dual magnetic circuits which cooperate to increase the flux density of the magnetic field between them. Specifically, the inner magnets 308 and outer magnets 312 increase the magnetic field in the volume in which the plurality of coils 312 are disposed. This increased flux density results in a higher output torque for a given current level relative to conventional designs employing only a single "outer" magnetic circuit.

During operation of the brushless motor 100, current is introduced through the coils 314 thereby creating a magnetic field having a direction that depends on the direction that the current is flowing through the coils 314. The magnetic fields produced by the coils 314 interact with the magnetic fields generated by the inner magnets and the outer magnets 312 in order to produce a rotational force that acts on the rotational components of the motor 100. The magnitude of the magnetic field produced by the coils 314 corresponds to the number of turns associated with each coil 314 and the amperage conducted through the conductive material. It should be understood that any type of conductive material with varying specifications can be used. It should further be understood that the coils 312 may be electrically connected to a power source and/or connected together in any manner known in the electrical and mechanical arts.

The outer magnets 312 can be, for example, substantially rectangular with a curved cross section as shown in FIG. 4, and can be coupled to a cylindrical support structure 111 surrounded by an interior wall of the motor housing 110. For example, the outer magnets 116 can be coupled to the support structure 111 during manufacturing with various adhesives and/or screws.

As noted above, the encoder assembly includes an encoder feedback scale mounted so as to rotate with the output shaft 108 and an encoder feedback read head 320. The encoder assembly can also include feedback circuitry (not shown) along with the encoder feedback scale for indicating positional feedback to, for example, the controller 106 or a controller not disposed within (such as a remote computer). The encoder feedback read head 320 (e.g., a sensor, a transducer etc.), can be paired with the encoder feedback scale that can encode position. The encoder feedback read head 320 can read the encoder feedback scale and convert the encoded position into an analog or digital signal. This in turn can then be decoded into position data by a digital readout (DRO) or motion controller (not shown). The encoder assembly can work in either incremental or absolute modes. Motion can be determined, for example, by change in position over time. Encoder technologies can include, for example, optical, magnetic, inductive, capacitive and eddy current.

The encoder feedback scale may include a series of stripes or markings running along a length of the linear encoder feedback scale printed on, or affixed to, the motor output shaft 108 or a surface coupled thereto. During operation of the brushless motor, the encoder feedback read head 320 (e.g., an optical reader) can count the number of stripes or markings read in order to determine the current position of the rotational components of the motor 100 relative to the non-rotational components. In some instances, the recorded positional data can be transmitted to a remote device for monitoring purposes. In some instances, a user can input one or more values to a remote device (such as a connected computer) in order to designate an amount of rotation desired for a particular task. These values can then be transmitted to a controller in electrical communication with the encoder assembly such that relative rotation of the plurality of rotational components can be adjusted according to the values specified. The brushless motor 100 may include any number of electrical connections and may include any number of electronic control sequences. Furthermore, in other embodiments, the motor 100 may include any number of on-board digital control and/or analog circuitry known in the electrical arts.

As is known, the controller 106, such as a servo controller, can generate control signals that operate the motor 100. For example, in accordance with programmed instructions, typically in the form of software, the controller 106 can generate control signals and output such control signals to the motor 100 to cause movement of the shaft 108. In one embodiment the controller 106 is programmed to control the motor 100 depending on the particular application for which the motor 100 is being utilized. Typically, a computer (not shown) is coupled to the controller 106 to generate and transmit software (code representing a set of instructions to be executed) generated in a programming language to the controller 106 for the specific application. Such software, once running on the controller 106, will instruct the motor 100 to move the shaft 108 in a manner specific to the particular application or task.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, FORTRAN, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Figure 5:
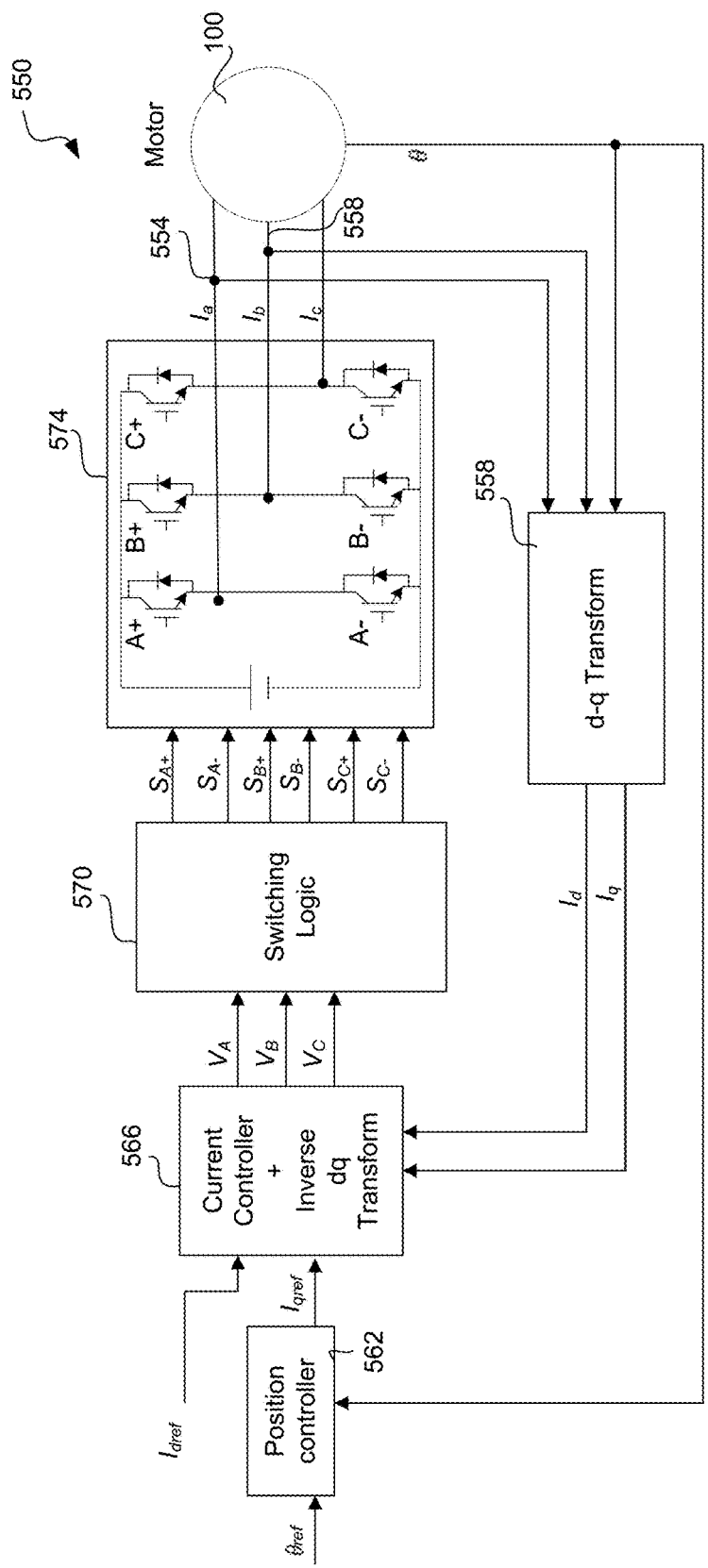
FIG. 5 is a functional block diagram of a motor control apparatus which may be incorporated within a controller of an embodiment of the high-torque, low-current brushless motor.

Turning to FIG. 5, a functional block diagram is provided of a motor control apparatus 550 which may be incorporated within the controller 106. In the embodiment of FIG. 5 the motor control apparatus 550 operates to drive the coils 314 of the motor 100 through sinusoidal commutation using a direct-quadrature (d-q) control process. That is, each coil phase is energized by a continuous sinusoidal current to produce motion at a constant torque.

During operation the motor control apparatus 550 functions to control currents flowing through the coils 314. To this end a first current sensor 554 detects a first current $I_a$ flowing through one of the coils 314 and a second current sensor 558 detects a second current $I_b$ flowing through another of the coils 314. As shown, measurements of the currents $I_a$, $I_b$ and an actual position signal ($\theta$) from the encoder read head 158 (or other position sensor operative to detect the angular position of a rotating component of the motor 100) are supplied to a d-q transform module 558 configured to implement a d-q transform (also known as a Park transform). As is known, the d-q transform may be used to effectively transform or otherwise project a three-phase system onto a two-dimensional control space. Although in the general case implementation of the d-q transform requires $I_c$ in addition to $I_a$, $I_b$ and $\theta$, in the present embodiment the 3-phase coils of the motor 100 are balanced and thus $I_c$ can be reconstructed from $I_a$ and $I_b$.

Implementation of the Park transform enables the module 558 to express the set of three sinusoidal currents present on the coils 314 as a direct axis current $I_d$ and a quadrature axis current $I_q$. Since the Park-transformed currents $I_d$, $I_q$ are essentially constant, it becomes possible to control the motor 100 by using the constant currents $I_d$, $I_q$ rather than the sinusoidal signals actually supplied to the motor 100.

As shown in FIG. 5, the control apparatus 550 includes a position control module 562 that receives a signal indicative of a reference angle ($\theta_{ref}$) as well as the actual position signal $\theta$ from the encoder read head 158. Based upon these values the position control module 562 provides a quadrature axis reference current $I_{q,ref}$ to a current controller and inverse d-q transform module 566. The current controller within the module 566 determines differences between the Park-transformed currents $I_d$, $I_q$ and the reference currents $I_{q,ref}$, $I_{d,ref}$ and performs an inverse d-q transform based upon the results. These operations yield command values $V_A$, $V_B$ and $V_C$ which are then mapped into inverter switching signals $S_{A+}$, $S_{A-}$, $S_{B+}$, $S_{B-}$, $S_{C+}$, $S_{C-}$, by switching logic 570. A 3-phase voltage source inverter 574 under the control of these switching signals then generates the currents $I_a$, $I_b$, $I_c$ delivered to the coils 314.

FIG. 6A illustrates an exemplary set of winding currents produced by the motor control apparatus for an embodiment of the motor 100 including six pole pairs. As shown in FIG. 6B, these winding currents result in the motor generating an essentially constant torque.

Figure 7:
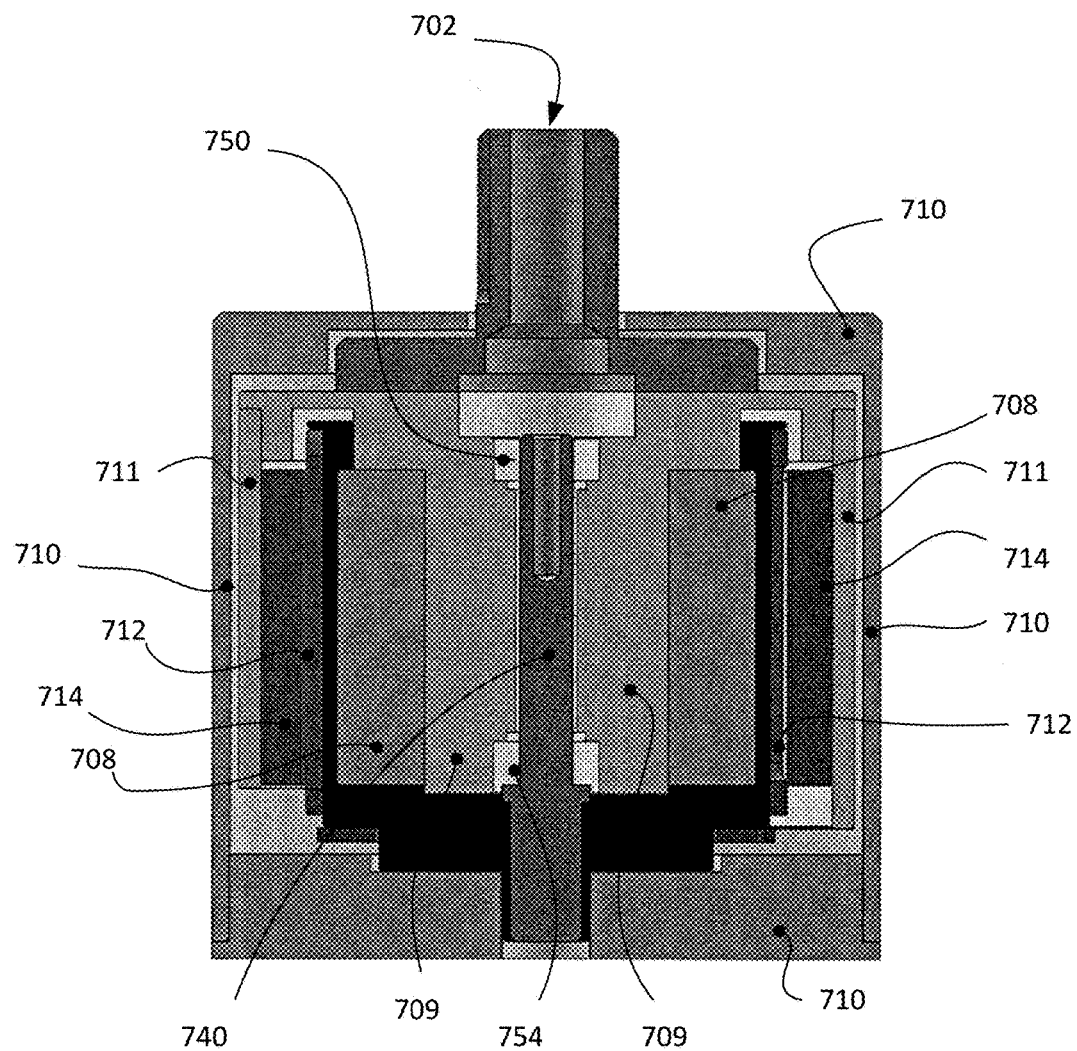
FIG. 7 is a cross-sectional view of a dual rotor magnet apparatus for a brushless electric motor in accordance with an embodiment.

Attention is now directed to FIG. 7, which provides a cross-sectional view of a dual rotor magnet apparatus 700 for a brushless electric motor in accordance with an embodiment. The dual rotor magnet apparatus 700 includes a coil assembly having a plurality of coils 712 arranged in the shape of a cylinder. A dual rotor includes a plurality of outer magnets 714 configured as a first Halbach cylinder surrounding the coil assembly. A cylindrical support structure 711 is coupled to and surrounds the plurality of outer magnets 714. The dual rotor further includes a plurality of inner magnets 708 arranged as a second Halbach cylinder. As shown, the plurality of coils 712 of the coil assembly are interposed between the plurality of inner magnets 708 and the plurality of outer magnets 714. In the embodiment of FIG. 7 the plurality of inner magnets 708 are coupled to a core element 709 accommodating an interior space or chamber 740.

The apparatus 700 further includes a housing 710 which surrounds the rotor and the coil assembly. An output shaft 702 coupled to, or integral with, the rotor may protrude from an aperture defined by the housing 710. Radial bearings 750, 754 are surrounded by the core element 709.

Turning now to FIGS. 8A-8E, various views of an alternate embodiment of a brushless electric motor 800 including a dual magnetic rotor are provided. In the embodiment of FIGS. 8A-8E, the motor 800 includes a dual magnet rotor assembly having a plurality of rotational components. Specifically, the plurality of rotational components includes a motor output shaft 802, a plurality of inner magnets 808 arranged in the shape of a first Halbach cylinder, and a plurality of outer magnets 814 also cylindrically arranged in a Halbach configuration. The plurality of rotational components further include a cylindrical inner magnet housing 818 and cylindrical outer magnet housing 820. The cylindrical inner magnet housing 818 is coupled to and supports the plurality of inner magnets 808 and surrounds the rotor shaft 802. The outer magnet housing 820 similarly supports the plurality of outer magnets 814. As shown in FIG. 8A, the motor output shaft 802 has an inner surface circumscribing and defining a vacuum thru shaft 830.

The motor 800 further includes a plurality of non-rotational components including a motor housing 810 and a cylindrical coil assembly 812 supported by a coil bobbin 816. In the embodiment of FIGS. 8A-8E, the cylindrical coil assembly 812 includes a plurality of coils arranged to form a cylindrical structure interposed between the plurality of inner magnets 808 and the plurality of outer magnets 814. That is, the plurality of outer magnets 814 surround the coil assembly 812 and the coil assembly 812 surrounds the plurality of inner magnets 808. The motor housing 810 surrounds the outer magnet housing 820 of the dual magnet rotor assembly. The output shaft 802 may protrude from an aperture defined by the motor housing 810. Radial bearings 850, 854 facilitate rotation of the output shaft 802. An encoder feedback read head 822 is positioned to read an encoder feedback scale positioned on, for example, the output shaft 802 or a rotating surface coupled to the output shaft.

During operation of the dual rotor magnet apparatus 800, the dual magnetic cylinders and the motor output shaft 802 rotate about a longitudinal axis circumscribed by the vacuum thru shaft 830. The motor housing 810, and an end plate 817 and a top plate 815 arranged substantially perpendicular to this longitudinal axis, do not rotate during operation of the motor 800. As shown, the end plate 817 defines an aperture 834 in communication with the vacuum thru shaft 830 and top plate 815 defines an aperture circumscribing the output shaft 802. The end plate 817 may also support an electrical connector 836 configured to, for example, provide electrical current to the coil assembly 812 and receive position feedback provided by the encoder feedback read head 822.

In one embodiment the motor 800 may be controlled by a controller disposed within a controller housing (not shown) abutting the motor housing 810. In other embodiments the controller for the motor 800 may be in essentially any location. For example, the controller may be located remote from the motor 800 (e.g., a remote computer in network communication with the motor).

Figure 9:
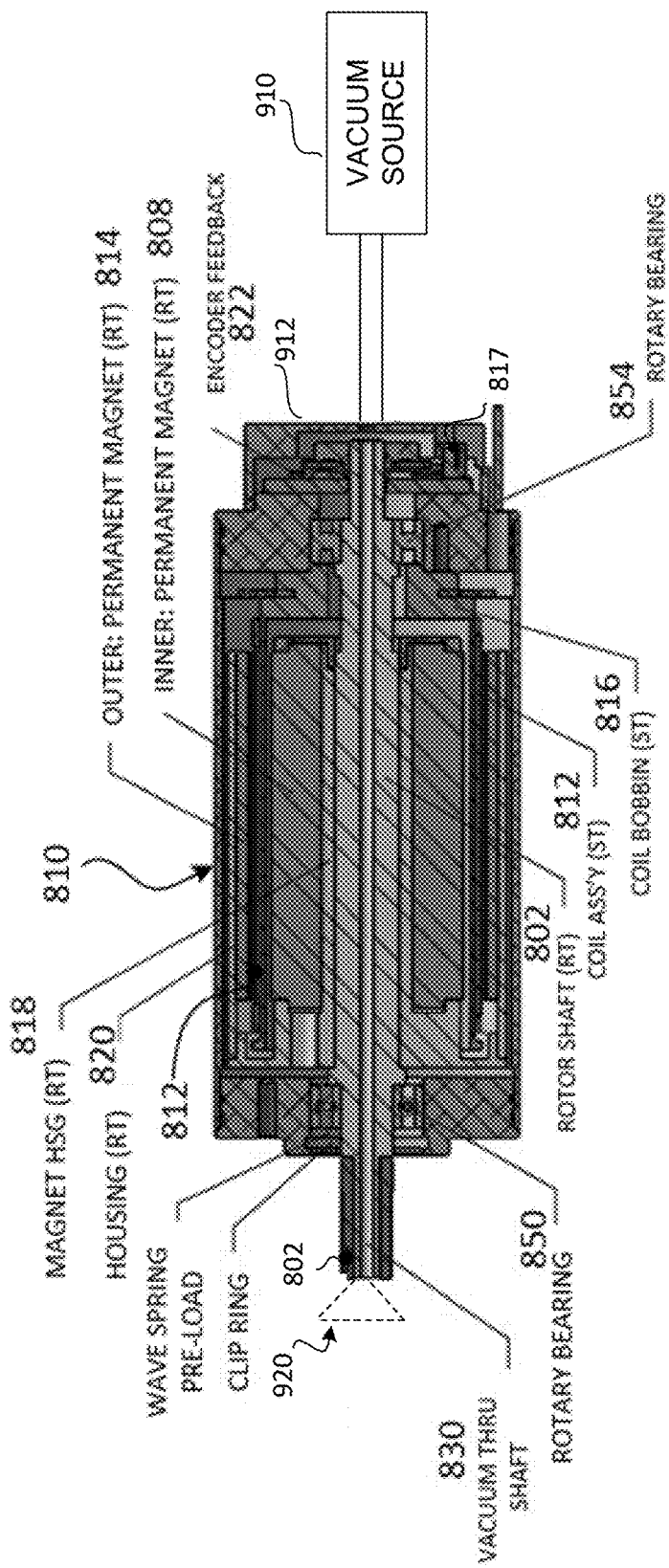
FIG. 9 shows an embodiment in which a brushless electric motor is coupled to an external vacuum source.

FIG. 9 shows an embodiment in which the brushless electric motor 800 is coupled to an external vacuum source 910. As shown, a connection passageway 912 of the vacuum source 901 is in communication with the vacuum thru shaft 830 through, for example, a vacuum fitting attached to the end plate 817 and positioned over the aperture 834. The vacuum shaft 830 leads to a vacuum gripping member 920 attached to an end of motor output shaft 802. An O-ring or the like seated within either of the vacuum gripping member 920 or the motor output shaft 802 can protect against vacuum leakage. When the motor 800 is connected to the external vacuum source 910, the gripping member 920 can facilitate precise handling of fragile components. In particular, the vacuum created by the vacuum source 910 (and thus provided to the gripping member 920 via that vacuum shaft 830) can be controlled manually or by a microprocessor to pick up or release components (not shown) proximate the gripping member 920.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention. The various embodiments of the invention should be understood that they have been presented by way of example only, and not by way of limitation. Likewise, the various diagrams may depict an example architectural or other configuration for the invention, which is done to aid in understanding the features and functionality that can be included in the invention. The invention is not restricted to the illustrated example architectures or configurations, but can be implemented using a variety of alternative architectures and configurations. Additionally, although the invention is described above in terms of various exemplary embodiments and implementations, it should be understood that the various features and functionality described in one or more of the individual embodiments are not limited in their applicability to the particular embodiment with which they are described. They instead can, be applied, alone or in some combination, to one or more of the other embodiments of the invention, whether or not such embodiments are described, and whether or not such features are presented as being a part of a described embodiment. Thus the breadth and scope of the invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. For example, "at least one" may refer to a single or plural and is not limited to either. The presence of broadening words and phrases such as "one or more," "at least," "but not limited to", or other like phrases in some instances shall not be read to mean that the narrower case is intended or required in instances where such broadening phrases may be absent.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only to be seen as references to suitable means for providing the described functionality, rather than indicative of a strict logical or physical structure or organization.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. An apparatus for use with a brushless motor, the apparatus comprising:
  a coil assembly having a plurality of coils wherein the plurality of coils are arranged in the shape of a cylinder, and
  a rotor including:
    a plurality of outer magnets configured as a first Halbach cylinder surrounding the coil assembly;
    an outer magnet housing coupled to the plurality of outer magnets, the outer magnet housing surrounding the plurality of outer magnets;
    a plurality of inner magnets arranged as a second Halbach cylinder wherein the coil assembly is interposed between the plurality of inner magnets and the plurality of outer magnets;
    an inner magnet housing coupled to the plurality of inner magnets;
    an output shaft surrounded by the inner magnet housing wherein the output shaft includes an inner surface defining a vacuum thru shaft.

2. The apparatus of claim 1 wherein each of the plurality of coils includes an inner surface forming a portion of an inner cylindrical surface of the coil assembly and an outer surface forming a portion of an outer cylindrical surface of the coil assembly;
  wherein both the inner cylindrical surface and the outer cylindrical surface of the coil assembly are surrounded by the plurality of outer magnets.

3. The apparatus of claim 1 further including a motor housing surrounding the plurality of outer magnets.

4. The apparatus of claim 3 wherein the motor housing defines an aperture circumscribing the output shaft.

5. The apparatus of claim 1 further including an end plate defining an aperture in communication with the vacuum thru shaft.

6. An electric motor, comprising:
  a coil assembly having a plurality of coils wherein the plurality of coils are arranged in the shape of a cylinder;
  a rotor including:
    a plurality of outer magnets configured as a first Halbach cylinder surrounding the coil assembly;
    an outer magnet housing coupled to the plurality of outer magnets, the outer magnet housing surrounding the plurality of outer magnets;
    a plurality of inner magnets arranged as a second Halbach cylinder wherein the coil assembly is interposed between the plurality of inner magnets and the plurality of outer magnets;
    an inner magnet housing coupled to the plurality of inner magnets;
    an output shaft surrounded by the inner magnet housing wherein the output shaft includes an inner surface defining a vacuum thru shaft;
  a motor housing surrounding the plurality of outer magnets; and
  an end plate including an electrical connector having an electrical connection to the coil assembly.

7. The electric motor of claim 6 wherein the end plate and a top plate are arranged substantially perpendicular to a longitudinal axis circumscribed by the output shaft, the top plate defining an aperture circumscribing the output shaft.

8. The electric motor of claim 6 wherein each of the plurality of coils includes an inner surface forming a portion of an inner cylindrical surface of the coil assembly and an outer surface forming a portion of an outer cylindrical surface of the coil assembly;
  wherein both the inner cylindrical surface and the outer cylindrical surface of the coil assembly are surrounded by the plurality of outer magnets.

9. The electric motor of claim 6 further including a rotary encoder configured to monitor angular position of the output shaft.

10. The electric motor of claim 6 further including a servo controller being electrically connected to the coil assembly.

11. The electric motor of claim 6 wherein the motor housing defines an aperture circumscribing the output shaft.

12. The electric motor of claim 6 further including an end plate defining an aperture in communication with the vacuum thru shaft.

* * * * *